US012083936B2

(12) United States Patent
Sel et al.

(10) Patent No.: US 12,083,936 B2
(45) Date of Patent: Sep. 10, 2024

(54) CHILD SAFETY SEAT ANCHOR COVER

(71) Applicant: Lear Corporation, Southfield, MI (US)

(72) Inventors: Alexander Sel, Augsburg (DE); Geraldine Arand, Oberding (DE); Jochen Kohlhofer, Altfraunhofen (DE)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/881,846

(22) Filed: Aug. 5, 2022

(65) Prior Publication Data

US 2023/0075983 A1    Mar. 9, 2023

(30) Foreign Application Priority Data

Sep. 8, 2021 (DE) .................... 10 2021 123 200.7

(51) Int. Cl.
*B60N 2/28* (2006.01)
*B60N 2/58* (2006.01)
*B60N 2/60* (2006.01)

(52) U.S. Cl.
CPC ......... *B60N 2/2893* (2013.01); *B60N 2/5858* (2013.01); *B60N 2/6009* (2013.01); *B60N 2/2824* (2013.01); *B60N 2/2827* (2013.01); *B60N 2/2842* (2013.01); *B60N 2/2881* (2013.01); *B60N 2/2887* (2013.01); *B60N 2/289* (2013.01); *B60N 2/5816* (2013.01)

(58) Field of Classification Search
None
See application file for complete search history.

(56) References Cited

U.S. PATENT DOCUMENTS

| 6,416,128 B1 | 7/2002 | Fujii |
| 9,352,676 B1 * | 5/2016 | Wright ................ B60N 2/2893 |
| 9,981,581 B2 * | 5/2018 | Okuhara .............. B60N 2/5833 |
| 10,202,055 B2 | 2/2019 | Oga |

(Continued)

FOREIGN PATENT DOCUMENTS

| DE | 10 253 176 A1 | 6/2004 |
| DE | 10 2016 213264 A1 | 1/2018 |

(Continued)

OTHER PUBLICATIONS

German Office Action for Application No. 10 2021 123 200.7 issued Feb. 20, 2024, 10 pages, including English Translation.

*Primary Examiner* — David E Allred
(74) *Attorney, Agent, or Firm* — Brooks Kushman P.C.

(57) ABSTRACT

A vehicle seat assembly includes a panel defined as a portion of a vehicle seat, the panel defines a first aperture therethrough to access an anchor and a second aperture therethrough, and has an engagement region thereon adjacent to the second aperture, a trim cover assembly including a trim cover, a strap connecting the trim cover to the vehicle seat, a seat frame and/or a vehicle framework via the second aperture, and a holder member. The holder member is sized to retract into and emerge from the second aperture, and has an edge configured to engage the engagement region. The trim cover assembly has a first position covering the first aperture to visibly hide the anchor, and a second position with the trim cover assembly spaced apart from the aperture to provide access to the anchor, where the edge of the holder member is engaged with the engagement region.

20 Claims, 4 Drawing Sheets

(56) References Cited

U.S. PATENT DOCUMENTS

| | | | | |
|---|---|---|---|---|
| 10,220,739 | B2* | 3/2019 | Okuhara | B60N 2/58 |
| 2018/0111528 | A1* | 4/2018 | Okuhara | B60N 2/5628 |
| 2018/0118065 | A1* | 5/2018 | Okuhara | B60N 2/2887 |
| 2020/0055427 | A1 | 2/2020 | Styn et al. | |

FOREIGN PATENT DOCUMENTS

| | | |
|---|---|---|
| DE | 10 2016 223365 A1 | 5/2018 |
| DE | 10 2019 217 364 A1 | 5/2021 |
| DE | 10 2020 103 481 A1 | 8/2021 |
| FR | 3 085 920 A1 | 3/2020 |

* cited by examiner

CHILD SAFETY SEAT ANCHOR COVER

CROSS-REFERENCE TO RELATED APPLICATION

This application claims foreign priority benefits under 35 U.S.C. § 119(a)-(d) to DE patent application 10 2021 123 200.7 filed Sep. 8, 2021, the disclosure of which is hereby incorporated by reference in its entirety.

TECHNICAL FIELD

The present application is directed to a trim cover assembly for child safety seat anchors on a vehicle seat assembly, and more particularly, a holder for the trim cover assembly.

BACKGROUND

Vehicle seats may include seat anchors that are used as attachment points for child safety seats. These seat anchors may be visible within the vehicle interior and to a vehicle occupant when a child safety seat is not in use.

SUMMARY

According to one or more embodiments, a vehicle seat assembly includes a panel defined as a region of a vehicle seat, the panel defining a first aperture therethrough to access an anchor and a second aperture therethrough, the panel having an engagement region thereon adjacent to the second aperture, and a trim cover assembly including a trim cover, a strap connecting the trim cover to the vehicle seat, a seat frame and/or a vehicle framework via the second aperture, and a holder member. The holder member is sized to retract into and emerge from the second aperture, with the holder member having an edge configured to engage the engagement region on the panel. The trim cover assembly has a first position covering the first aperture to visibly hide the anchor where the holder member is stored within the second aperture and a second position with the trim cover assembly spaced apart from the aperture to provide access to the anchor through the aperture where the edge of the holder member is engaged with the engagement region to support the trim cover in the second position.

According to one or more embodiments, a vehicle seat assembly includes a seat providing a seating surface and having a panel region defined as a portion of or between a seat back and a seat base, with the panel defining a first aperture and second aperture therethrough. The vehicle seat assembly further includes an anchor connected to a seat frame member or a vehicle framework, and extending towards the seating surface, the anchor being accessible through the first aperture from the seating surface. The vehicle seat assembly also includes a trim cover assembly movably connected to the seat member between a first position and a second position, the trim cover assembly including a trim cover, a strap cooperating with the seat, the seat frame member, and/or the vehicle framework to secure the trim cover, and a holder member having a curved profile and sized to retract into the second aperture in the first position, and being engageable with an engagement region on the panel in the second position. The trim cover is configured to cover the first aperture, the second aperture, and anchor when the anchor is not in use in the first position, and to provide access to the anchor through the first aperture in the second position by being held via the holder member in the second position.

According to one or more embodiments, a method includes forming a panel for a vehicle seat with a first aperture and a second aperture therethrough such that an anchor for a child safety seat is accessible via the first aperture, and forming a trim cover assembly including a trim cover, a strap, and a holder member. The method further includes connecting the trim cover assembly to a framework of a vehicle, a seat framework, and/or the vehicle seat by the strap such that the trim cover is movable between a first position and a second position via movement of the strap in and out of the second aperture, and positioning the trim cover assembly in the first position adjacent to the panel to cover the aperture and the anchor. The method also includes moving the trim cover assembly to the second position spaced apart from the aperture to provide access to the anchor through the aperture and holding the trim cover assembly in the second position by securing an edge of the holder member with an engagement region defined on the panel.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Moreover, except where otherwise expressly indicated, all numerical quantities in this disclosure are to be understood as modified by the word "about" in describing the broader scope of this disclosure whether or not explicitly noted. Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred. Furthermore, the term "substantially" may be used herein to describe aspects of the present disclosure. The term "substantially" may modify a value or relative characteristic disclosed and may signify that the value or relative characteristic it modifies is within ±0%, 0.1%, 0.5%, 1%, 2%, 3%, 4%, 5%, or 10% of the value or relative characteristic. Any value or relative characteristic provided herein may be modified by "substantially" whether or not explicitly noted.

According to embodiments, a trim cover is provided. The trim cover may be configured to cover a child seat anchor in a vehicle seat assembly. Although hereinafter the trim cover will be referenced as a cover for a child seat anchor, other applications of the trim cover on various components is contemplated, and discussion of the cover with respect to anchors is not intended to be limiting. The trim cover assembly is secured on one edge to the seat (for example, the seatback or framework of the seat assembly) and also connected via a holder to the framework of the seat assembly such that the trim cover can pivot with respect to the secured edge to uncover the anchor, and be held in a use position while the anchor is being used via the holder. The holder is attached to the framework at a first end, and to the trim cover at the other end, and has a curved profile therebetween that allows for the trim cover to be translated through an aperture in the seat assembly when the cover is being move to and from the use position.

Figure 1:
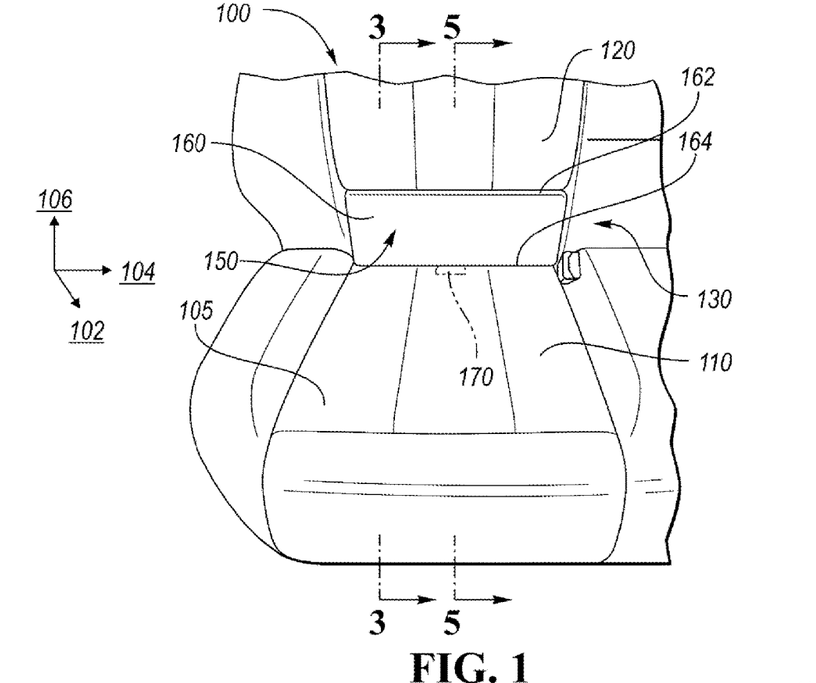
FIG. 1 is a partial perspective view of a seat assembly with an anchor trim cover, according to an embodiment.
Figure 2:
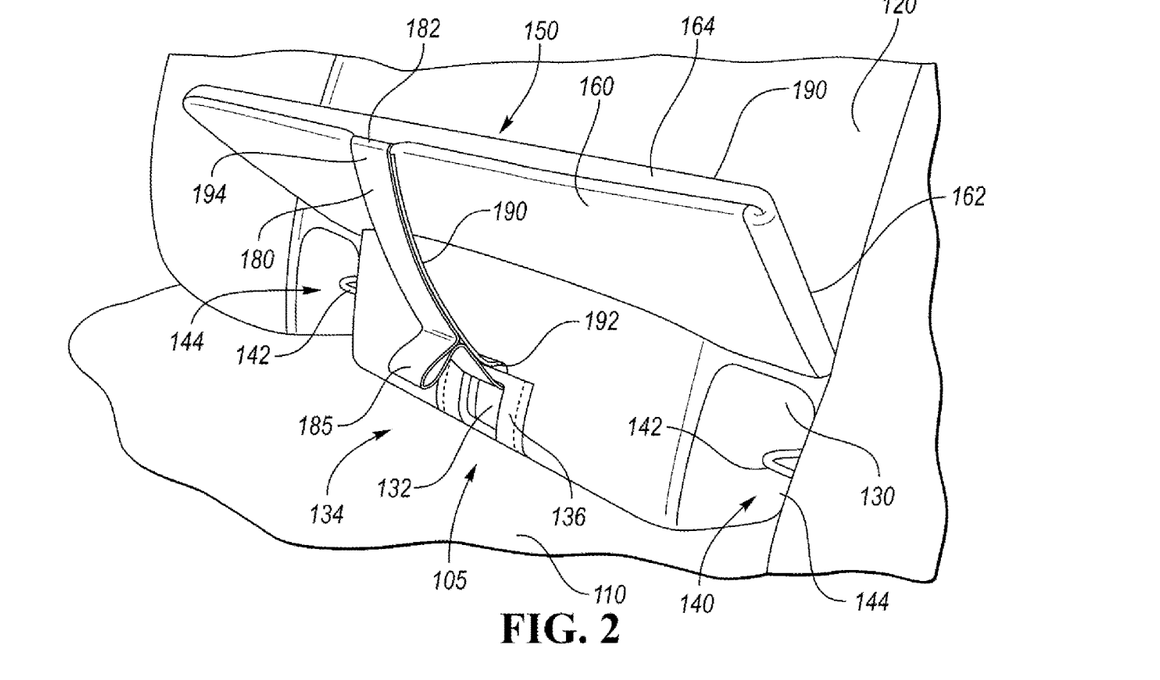
FIG. 2 is a partial perspective view of the seat assembly of FIG. 1, with the anchor trim cover in the use position.
Figure 3:
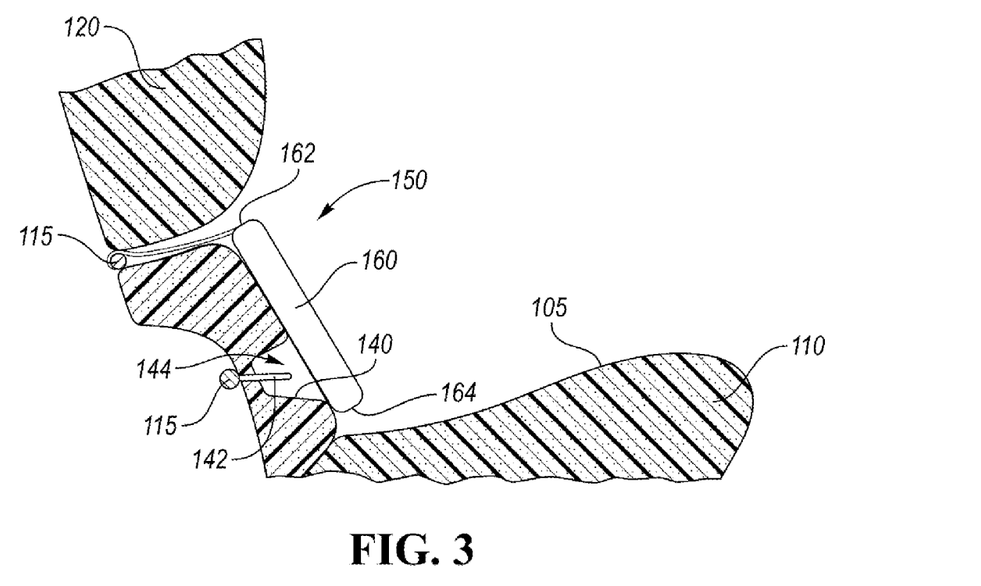
FIG. 3 is a partial cross-sectional view of the seat assembly of FIG. 1, taken along 3-3, according to an embodiment.
Figure 5:
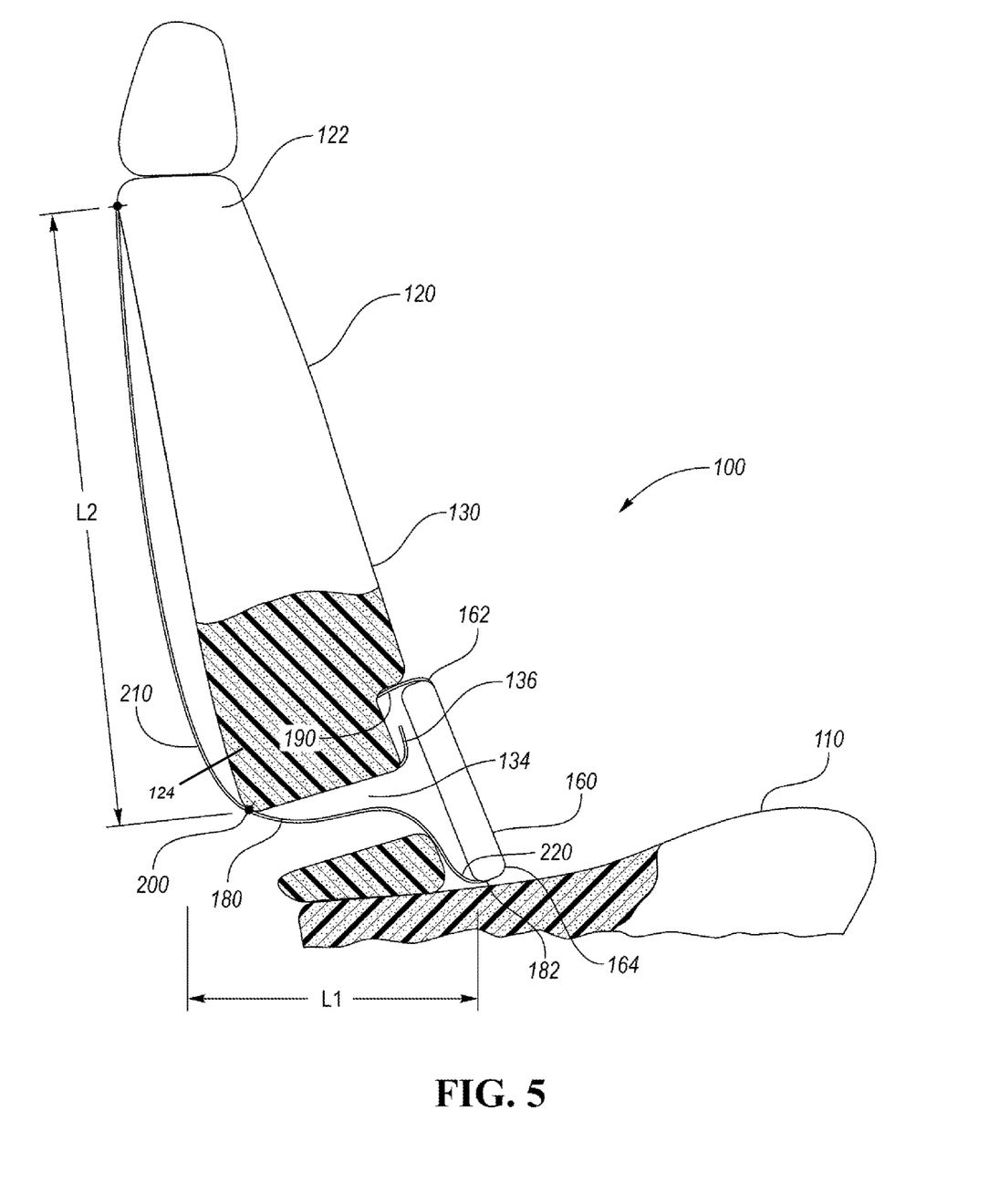
FIG. 5 is a partial cross-sectional view of the seat assembly of FIG. 1, taken along 5-5 according to an embodiment.

FIGS. 1-3 illustrate a vehicle seat assembly 100, according to one or more embodiments. The vehicle seat assembly includes a seat base 110 (or, interchangeably, seat bottom 110) and a seat back 120 that cooperate to form a seating surface 105 for a vehicle occupant. Although a bench seat is shown as an example, other seat types such as bucket seats or captain's seats are also contemplated. Each of the seat base and seat back 110, 120 of the seat assembly 100 includes a substrate or framework, a cushion supported by the substrate or framework, and a trim cover in a covering relationship with the cushion. The vehicle seat assembly 100 has a longitudinal direction 102, a transverse direction 104, and a vertical direction 106 that correspond generally to a vehicle coordinate system when the seat assembly 100 is installed. At the lower end of the seat back 120, approaching the seat base 110 and between the seatback 120 and seat base 110, the vehicle seat assembly 100 includes a panel 130 at a lower end of the seatback 120 between seatback 120 and seat base 110, or positioned at an upper edge of the seat base 110, as forming a part of the seating surface 105. Although the panel 130 is shown in FIGS. 1-3 as a separate component positioned to cooperate with the seatback 120 and the seat base 110, and positioned therebetween, in other embodiments (as shown in FIG. 5), the panel 130 may be defined as a portion of the lower end of the seatback 120. The panel 130 of the vehicle seat assembly 100 is a portion having apertures 140 which expose anchors 142, as shown in FIG. 3. The apertures 140 are sized to provide an opening of sufficient size for a component to be accessed therethrough, such as a child safety seat latch with an anchor 142 disposed in the aperture 140. Thus, although shown as sized for a child safety latch anchor 142, the aperture 140 may be any suitable size as based on the desired design of the panel 130. The aperture 140 is spaced apart from and positioned forward of the anchor 142 along the longitudinal direction 102 such that the anchor 142 is recessed in the aperture 140 of the panel 130, where the aperture 140 forms a recessed region 144 around the anchor 142. In some embodiments, and as shown in FIGS. 2-3, a cushion material forms the panel 130 with the recessed region 144 therein to provide clearance around each anchor member 142.

The anchors 142 are standardized attachment points that allow for a child safety seat to be quickly and securely attached to the conventional vehicle seat assembly 100. For example, the anchors may be referred to as ISOFIX anchors or be anchors associated with a LATCH anchor system, with the child safety seat being clippable to the anchors 142. As shown in FIG. 3, one or more frame members 115 for securing the anchors and the trim cover 160 thereto are positioned within or between the seat base 110 and the seat back 120, and away from the seating surface. The one or more frame members 115 provide a support structure for anchors 142. The one or more frame members 115 may be, in some embodiments, a part of or connected to the framework that supports the seat base 110 and/or the seat back 120, and may also be secured to the vehicle framework or other vehicle component (not shown) (e.g., floor or walls). In other embodiments, the frame member 115 may be independent of the framework of the seat and may be secured to the vehicle framework or other component. At least one frame member 115 may extend across the seat assembly 100 in the transverse direction 104 such that the anchors 142 protrude forward through the apertures 140 in the longitudinal direction 102. The frame member(s) may be formed from a metal or metal alloy.

The anchors 142 each include a bracket that connect an associated anchor bar or anchor point to the frame member 115. The anchors 142 provide a pair of lower attachment points for connection with the base of the child safety seat. The vehicle seat assembly 100 may be provided with one or more pairs of anchors 142, with each pair of anchors for use with an associated child safety seat. For example, the seat assembly 100 may be a captain chair style seating with a single pair of anchors 142 for use with one child safety seat. In the example shown in FIG. 1, with bench style seating, the vehicle seat assembly 100 may be provided with two or three pairs of anchors 142. In another example, the seat assembly 100 may have a first pair and a second pair (not shown) of anchor members 142, with each pair being associated with a respective occupant seating area, as for bench style seating. In some embodiments, the seat assembly 100 may additionally include a single upper attachment point (not shown) for a tether attachment.

Each anchor 142 extends from the support frame member 115 towards the seating surface 105. The anchor 142 is positioned between the seat base 110 and the seat back 120, adjacent to the lower end region of the seat back 120, at panel 130. Each anchor 142 is provided with a crossbar at the distal end that connects with the child safety seat latch. In one example and as shown in FIG. 3, the crossbar extends transversely relative to the vehicle seat assembly 100. The crossbar may extend between a pair of spaced apart arms of the anchor 142, such that the anchor 142 is generally U-shaped. The anchor may be formed from a metal or a metal alloy, and may have a circular cross-sectional shape, or another cross-sectional shape.

Referring to FIGS. 1-3, the vehicle seat assembly 100 further includes a trim cover assembly 150 including a trim cover 160 over the panel 130 for covering the apertures 140 and the anchors 142. In FIG. 1, the trim cover assembly 150 is shown in the covered position, and in FIGS. 2 and 4, the trim cover assembly 150 is shown in the use position. Although one trim cover 160 is shown for the trim cover assembly 150, each respective pair of anchors 142 may have a respective trim cover assembly 150 associated therewith, or, in some embodiments, a trim cover assembly 150 may be associated with each individual anchor 142. The trim cover 160 is provided to cover and conceal the associated anchor(s) 142 while not in use (i.e., the covered position). The trim cover 160 also covers and conceals the recessed region 144 of the aperture 140 in the panel 130 surrounding the anchor(s) 142. The trim cover 160 is formed using flexible materials or fabrics to allow for a portion of the trim cover assembly to be moved by a user to access the anchors 142, and to connect, disconnect, or otherwise use the anchor bar with a child safety seat. For purposes of the disclosure, fabric may refer to various fabrics used in vehicle interiors, and includes cloth, vinyl, leather, faux leather, and the like, and combinations thereof. The trim cover 160 includes an outer layer visible from the seating surface 105. For example, the trim cover 160 may additionally include one or more internal panel layers (not shown) formed from a material such as a plastic to provide rigidity and structure to the trim cover 160, with the internal panel layer(s) being covered with a fabric. The fabrics may be provided as inner and/or outer layers of the trim cover 160, and the panel layer(s) may provide supporting layer(s). Fabric on the outer layer may additionally include visual indicia provided on the outer layer or connected to the outer layer. The visual indicia may be a symbol or another visual indication that an anchor 142 is located beneath the trim cover assembly 150. In one example, the visual indicia is provided by an embroidery or other stitching. In another example, the visual indicia is provided by a label that is attached to the outer layer, for example, using an adhesive. In yet another example, the visual indicia is provided as an insert such as a badge that is received within an associated aperture (not shown) formed in at least the outer layer and is connected to the trim cover assembly 150.

In further examples, the trim cover assembly 150 may be provided with sufficient structural rigidity by the fabric materials such that panel layer(s) are unnecessary. The trim cover assembly 150 is sized to correspond with at least the size of one aperture 140, or may be sized to correspond to the size of the panel 130 such that the trim cover 160 conceals the panel 130 when the trim cover assembly 150 is covering the anchors 142, as shown in FIG. 1. In certain embodiments (not shown), the trim cover assembly 150 may be sized larger than the panel 130 and may further cover portions of the seatback 120 and/or the seat bottom 110. As such, the size and dimensions of the trim cover 160 may be based on the selected design.

Figure 4:
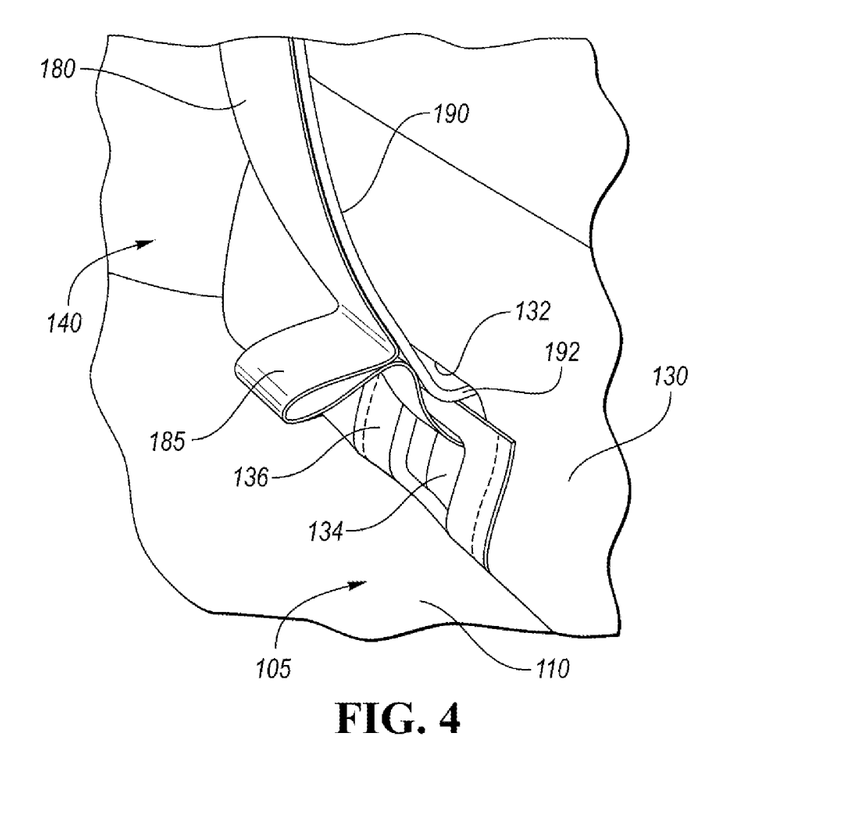
FIG. 4 is a close-up view of the open anchor trim cover of FIG. 2.

As shown in FIGS. 2-4, according to one or more embodiments, the trim cover assembly 150 is pivotally connected to the vehicle seat assembly 100 at a fixed edge 162 of the trim cover 160 such that the trim cover 160 pivots about the fixed edge 162 to uncover the panel 130. The fixed edge 162 may be connected to the seatback 120, the seat bottom 110, the framework 115, the panel 130, or combinations thereof by any suitable mechanism, including, but not limited to, stitching, adhesive, elastic, or other attachment. In the embodiment shown in FIG. 3, the trim cover 160 is shown secured to the framework 115 via a strap connected to the fixed edge 162 and extending through a gap between the seatback 120 and the panel 130. In another embodiment, as shown in FIG. 5, the trim cover 160 is shown attached to the seatback 120. The trim cover 160 is movable with respect to the fixed edge 162 such that the anchors 142 can be exposed for attachment of the child safety seat.

The trim cover 160 optionally includes a tab 170 connected to the trim cover 160 at a free edge 164, opposite the fixed edge 162 as spaced from the fixed edge 162 in the vertical direction 106, to facilitate movement of the trim cover assembly 150 between the covered position (FIGS. 1 and 3) and the use position (FIGS. 2 and 4). In the covered position in certain embodiments, the tab 170 may be attached to the free edge 164 such that it protrudes from a gap between the trim cover assembly 150 and the seat assembly 100. In FIG. 1, the gap is between the trim cover assembly 150 and the seat base 110, however the tab 170 may be located based on the position of the trim cover assembly 150, the panel 130, and the seat assembly 100, and the embodiment shown in FIG. 1 is not intended to be limiting. Furthermore, in embodiments where the trim cover assembly 150 does not include a tab 170, the trim cover 160 is merely moved by the user using the free edge 164. The tab 170 facilitates movement of the trim cover 160 by providing a grasping element for pulling the trim cover assembly 150 from covered position to the use position. The tab 170 may be any suitable material, such as, but not limited to fabric or leather, or a rigid material. In some embodiments, tab 170 may be a loop of fabric or in other embodiments include layers of fabric with a rigid component.

As can be seen in the use position, as shown in FIGS. 2 and 4, the trim cover assembly 150 can be flipped (and the anchors 142 exposed) at an angle with respect to the panel 130. In the use position, the trim cover assembly 150 does not obstruct the attachment of a child safety seat to the anchors 142, and covers the anchors 142 when not in use. The outer face of the trim cover assembly 150 faces outwardly to display the indicia to an occupant when the trim cover assembly is in the covered position/the storage position, and is flipped upward in the use position about the axis defined by the fixed edge 162. The trim cover assembly 150 includes a strap 180 connected to the trim cover 160 on an inner side, opposite the outer layer. The strap 180 connects trim cover assembly 150 to the seat assembly 100 at the seat framework and/or a frame member 115 in some embodiments (not shown), and to the seatback 120 in other embodiments, as shown in FIG. 5. The trim cover assembly 150 is thus flexibly connected to the vehicle seat assembly 100 such that it can be moved from a covered first position (FIGS. 1 and 3) to the uncovered second position (FIGS. 2 and 4), with the strap 180 being tensioned when in the exposed position. The strap 180 includes an end portion 182 located toward the free edge 164 of the trim cover assembly 150, and a distal end (not shown) connected to the frame structure 115 in some embodiments, the seat base 110 in other embodiments, or the seat back 120 in yet other embodiments (for example, as shown in FIG. 5), or combinations thereof. The strap 180 may be looped around an attachment member of the framework structure of any of the above options, or otherwise secured or connected to a seat component (e.g., seatback 120 or seat bottom 110) such that it can freely rotate around the attachment member, and be tensioned such that the trim cover assembly 150 can move relative to panel 130 and seat back 120. For example, in the embodiment shown in FIG. 5, the strap 180 may extend through a panel aperture 134 through the panel 130 for connection to the seatback 120. In the example of FIG. 5, the strap 180 is connected to the seatback 120 at an upper end 122, while the strap 180 extends through the panel aperture 134 towards the lower end 124 of the seatback 120. The strap 180 may be any suitable flexible material.

Referring again to FIG. 2 and, as shown in more detail in FIG. 4, the trim cover assembly further includes a holder member 190 attached to the strap 180 and configured to support the trim cover 160 in the use position via engagement with a slot 132 on the panel 130 sized to receive an edge 192 of the holder member 190 therein. The slot 132 may be an opening or pocket formed in a material member 136 positioned adjacent to at least a portion of the panel aperture 134, with the aperture 134 being sized to receive the strap 180 and the holder member 190 therethrough. Although the slot 132 is shown as a pocket space between the material member 136 and the panel 130, the slot 132 may also be interchangeably referred to as an engagement region 132 adjacent to the panel aperture 134 that is configured to support the edge 192 of the holder member 190 thereon. As such, the engagement region 132 may be any suitable connection for the edge 192 with the engagement region 132, and an interference fit within the slot 132 is not intended to be limiting. Thus, engagement region 132 and the slot 132 may be referred to interchangeably, with the slot 132 being any suitable engagement for the edge 192 of the holder member 190. The other end 194 of the holder member 190, opposite the edge 192, is secured near or at the free edge 164 of the trim cover 160.

As will be discussed with reference to FIGS. 6A-B, the holder member 190 has a curved profile such that the trim cover 160 can be moved in a pivoting motion about the fixed edge 162 as the pivot axis, and such that an edge 192 of the holder member 190 can be engaged with the engagement region 132 (e.g., slot 132) via an interference fit or other removably attachable mechanism (e.g., hook and loop fastener, or other suitable mechanism). The holder member 190 may be any suitable material, such as, but not limited to, a flexible thermoplastic material. For example, the holder member 190 may be polypropylene. The holder member 190 can be secured or otherwise connected to the strap 180 in any suitable manner, for example, via stitching, an adhesive, or other mechanical fastener. The holder member 190 may be sized and shaped based on the strap 180 such that it is integrated with the strap 180. In certain embodiments, the holder member 190 has a thickness of 0.2 mm to 10 mm, in other embodiments 0.5 mm to 9.5 mm, and in yet other embodiments 0.75 mm to 9 mm. The holder member 190 supports the trim cover 160 when in the use position such that the anchors 142 can remain exposed by providing structural support to the trim cover via adding rigidity to the strap 180 and the interference fit with the slot 132. The holder member 190 is sufficiently rigid to maintain its shape when in the use position and in the covered position, as well as during movement therebetween. The strap 180 includes a positioning tab 185 for facilitating the positioning of the holder member 190 within the slot 132, and facilitate removal of the holder member 190 from the slot 132. The positioning tab 185 is located on the strap towards the edge 192 of the holder member 190, as the positioning tab 185 facilitates the placing and removal of the edge 192 into the slot 132. The positioning tab 185 may be the same material as the strap 180, or may be another suitable flexible or rigid material for facilitating movement of the strap 180 and the holder member 190.

In the stored/covered position (referring to FIGS. 1 & 3), the holder member 190 is retracted through the panel aperture 134 in the panel 130 and stored within the seat assembly 100. In the use position, the strap 180 is pulled when the free edge 164 of the trim cover 160 is lifted, such that the strap 180 is under tension with respect to the framework and/or frame member 115, and the holder member 190 is also pulled out of the panel aperture 134 such that the edge 192 can be positioned within the slot 132. The curved profile of the holder member 190 allows for the smooth transition between the use and covered position via the motion of the holder member 190 into and out of the panel aperture 134, and for the free edge 164 of the trim cover 160 to be held in the use position.

Referring again to FIG. 4, to move the trim cover 160 to the use position, the strap 180 extends from inside the panel aperture 134 outward in the longitudinal direction 102 and the vertical direction 106 such that the trim cover assembly 150 can be held (and the anchors 142 exposed) above panel 130 (via the edge 192 of the holder member 190 being positioned within the slot 132). When the strap 180 is pulled with respect to the framework and/or the frame member 115, the strap 180 is under tension such that the lower end of the strap 180 can be forcibly moved via the positioning tab 185 such that the holder member 190 can be held by interference fit within the slot 132 on the panel 130. Upon pulling the positioning tab 185 of the strap 180, the holder member 190 is disengaged from the slot 132, and the strap 180 and the holder member 190 can be pushed into the panel aperture 134 such that the trim cover 160 can be pivoted back into the covered position to cover the anchors 142. As such, in the use position, the trim cover assembly 150 does not obstruct the attachment of a child safety seat to the anchors 142 with the holder member 190 providing support to hold the trim cover 160 in the use position, but covers the anchors 142 when not in use with the holder member being stored in the seat assembly 100.

Referring again to FIG. 5, the embodiment with the strap 180 being secured to the upper end 122 of the seatback 120 is shown. In at least one embodiment, as depicted in FIG. 5, the strap 180 may be stitched via a seam 200 to an elastic member 210 which is connected to the seatback 120 at the upper end 122. In certain embodiments, the elastic member 210 is connected to the upper end 122 via framework (not shown) of the seatback 120, and in other embodiments, may be connected in any suitable manner to the upper end 122, such as, for example, by stitching, adhesive, or other mechanical fastening. The strap 180 may be a flexible material through a first length L1 of the strap 180 as would be a visible portion 220 when the trim cover 160 is in the use position, and the internal length L2 of the strap 180 may be the elastic material to allow the strap 180 to be pulled in tension to the use position, to facilitate return of the trim cover 160 to the storage position. Although shown as two separate material components, the strap 180 may be a single material secured to the seatback 120, or any number of material components to impart the desired motion and flexibility of the components secured to the strap 180.

Figure 6A:
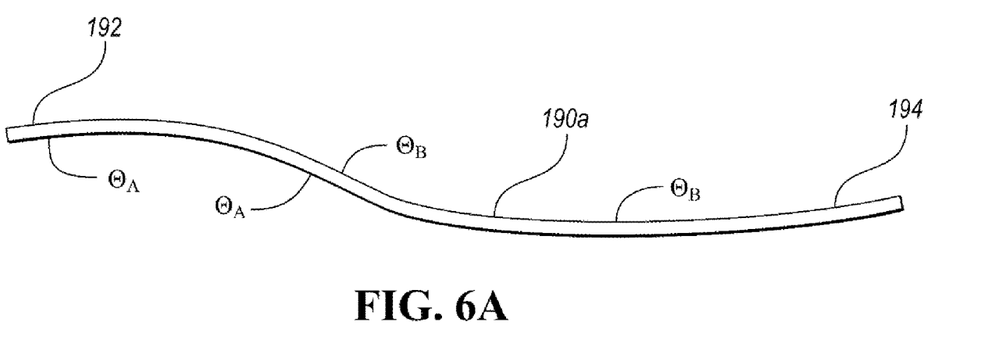
FIG. 6A is a side-view of a holder for an anchor trim cover, according to an embodiment.
Figure 6B:
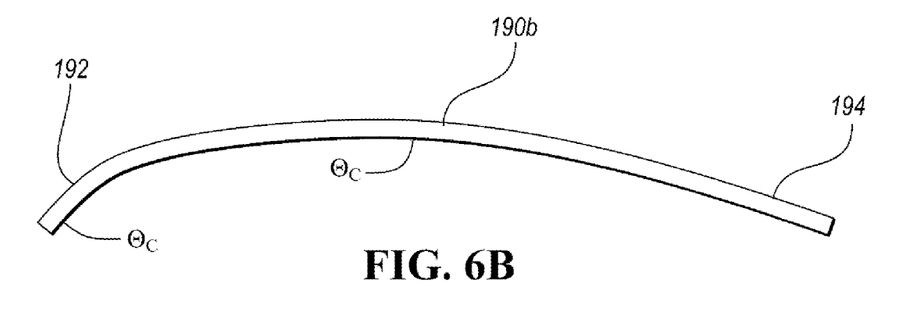
FIG. 6B is a side-view of a holder for an anchor trim cover, according to another embodiment.

Referring to FIGS. 6A-B, various examples of the holder member 190a, 190b are shown. The holder members have a curved profile between the edge 192 and the other end 194, such that the holder member 190a, 190b can be moved into and out of the panel aperture 134 when the trim cover is pivoted from a storage position to a use position. The curvature may be, in some embodiments, based on the dimensions of the trim cover and the degree of rotation of the free edge 164 about the axis formed by the fixed edge 162. In certain embodiments, the holder member 190 includes at least one curved portion, shown by angles $\Theta_{A-C}$ in FIGS. 6A-B. Each curved portion may have a degree of curvature independent of another curved portion. Furthermore, one curved portion may be in an opposing direction from another curved portion. In one example, the holder member may have an S-shaped profile, with two curved portions, as shown in FIG. 6A with two opposing curved portions as defined with degrees of curvature $\Theta_A$ and $\Theta_B$. In the example of FIG. 6B, the holder member 190b includes one curved portion with a degree of curvature $\Theta_C$. The curvature of the holder member 190 may be any suitable curvature and have any suitable number of curved portions as based on the dimension of the trim cover 160. For example, each curved portion of the holder member 190 may have a degree of curvature of up to 90 degrees, as based on ends of an arc formed by the curved portion. In certain embodiments, the degree of curvature may be 5 degrees to 85 degrees, and in yet other embodiments, 10 degrees to 80 degrees. However, the degree of curvature of each curved portion need not be related to a circular arc, and may be a curved portion as based on an oval or other circular or semi-circular shape. In at least one embodiment, a curved portion of the holder member 190 has the edge 192 for engaging with the slot 132. With reference to FIG. 6A, based on the curvature of the holder member 190a, either end of the holder member 190a may be configured to engage with the slot 132 when the trim cover 160 is moved from the storage to use position. With reference to FIG. 6B, the edge 192 of the holder member 190b is configured to engage with the slot 132, while the other end 194 is configured to be attached (i.e., via stitching) towards the free edge 164 of the trim cover 160.

A method of providing a trim cover assembly, and for assembling the trim cover assembly to a vehicle seat assembly is provided according to an example and for use with the assemblies shown in the Figures. In other examples, various steps may be omitted, added, rearranged into another order, or performed sequentially or simultaneously.

A lower panel is formed for a vehicle seat, the lower panel having an aperture such that an anchor for a child safety seat is accessible via the aperture. The lower panel is located or defined at a lower end of a vehicle seat back, between the seat back and seat base. A trim cover assembly is formed with a trim cover which is connected to a vehicle seat by a strap such that the trim cover assembly covers the lower panel when the anchors are not in use. The strap may connect the trim cover assembly to the seat, the vehicle framework and/or a frame member of the seat. The trim cover assembly is also formed with a holder member attached to the strap, between the trim cover and the framework and/or frame member, the holder member being configured to support the trim cover when the anchors are uncovered via engagement with an engagement region within the lower panel sized to engage an edge of the holder member therein. The trim cover assembly is moveable between a covered position and a use position via movement of the strap and engaging of the holder member with the engagement region.

When the trim cover assembly is in the first cover position, the trim cover assembly covers the lower panel, with the strap extending through a panel aperture through the lower panel to be connected to the frame, seat back, or seat base. When the trim cover assembly is in the use position, the trim cover assembly provides access to the anchor by pivoting about a fixed edge of the trim cover to expose the anchors. In some embodiments, the strap includes a positioning tab to facilitate moving the edge of the holder member with the engagement region.

As such, according to one or more embodiments, a trim cover assembly is provided. The trim cover assembly includes a strap and a holder member which cooperate for moving the trim cover assembly from a first position, covering a panel having apertures therein for covering anchors exposed through the apertures, to a second position, providing access to the anchors. The panel includes another aperture sized to have the strap and holder member emerge from and retract into upon movement of the trim cover of the trim cover assembly. The holder member has a curved profile to allow for movement of the trim cover, and has an edge configured to engage an engagement region on the panel to support the trim cover in the second position. In certain embodiments, the engagement region is a slot defined adjacent to the aperture for the strap and holder, and may be formed as a pocket on the panel to receive the edge of the holder member therein via interference fit.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the invention and the disclosure.

What is claimed is:

1. A vehicle seat assembly, comprising:
a panel defined as a portion of a vehicle seat, the panel defining a first aperture therethrough to access an anchor and a second aperture therethrough, the second aperture being spaced from the first aperture, the panel comprising an engagement region thereon adjacent to the second aperture; and
a trim cover assembly including a trim cover, a strap connecting the trim cover to the vehicle seat, a seat frame, and/or a vehicle framework via the second aperture, and a holder member configured to retract together with the strap into and emerge from the second aperture, the holder member comprising a first edge and a distal edge opposite to the first edge, the first edge of the holder member secured to the trim cover, and the distal edge configured to engage the engagement region on the panel,
wherein the trim cover assembly has:
a first position covering the first aperture to visibly hide the anchor where the holder member is stored within the second aperture, and
a second position spaced apart from the first aperture to provide access to the anchor through the first aperture, where the distal edge of the holder member is engaged with the engagement region to support the trim cover in the second position.

2. The vehicle seat assembly of claim 1, wherein the trim cover has a fixed edge spaced vertically upward from a free edge, with the trim cover being pivotable about an axis defined by the fixed edge via movement of the free edge of the trim cover from the first position to the second position.

3. The vehicle seat assembly of claim 1, wherein the strap includes a tab to facilitate engagement of the distal edge of the holder member with the engagement region.

4. The vehicle seat assembly of claim 1, wherein the holder member has a curved profile based on movement of the trim cover from the first position to the second position.

5. The vehicle seat assembly of claim 1, wherein the holder member has at least one curved portion having a degree of curvature of up to 90 degrees.

6. The vehicle seat assembly of claim 1, wherein the holder member has two curved portions forming an S-shaped profile.

7. The vehicle seat assembly of claim 1, wherein the holder member is a flexible thermoplastic.

8. The vehicle seat assembly of claim 7, wherein the holder member is polypropylene.

9. The vehicle seat assembly of claim 1, wherein in the second position, the strap is tensioned with respect to the vehicle seat, seat framework and/or vehicle framework such that the holder member can be held via interference fit of the distal edge with the engagement region.

10. The vehicle seat assembly of claim 1, wherein the engagement region is a slot defined between a material member and the panel and sized to receive the distal edge.

11. The vehicle seat assembly of claim 10, wherein the material member is positioned adjacent to at least a portion of the second aperture.

12. The vehicle seat assembly of claim 10, wherein the holder member has a thickness such that the distal edge engages the slot via an interference fit.

13. The vehicle seat assembly of claim 12, wherein the thickness is 0.2 mm to 10 mm.

14. A vehicle seat assembly, comprising:
a seat providing a seating surface and having a panel defined as a portion of or between a seat back and a seat base, the panel defining a first aperture and second aperture therethrough, the second aperture being spaced from the first aperture;
an anchor connected to a seat frame member or a vehicle framework, and extending towards the seating surface, the anchor being accessible through the first aperture from the seating surface; and
a trim cover assembly movably connected to the seat between a first position and a second position, the trim cover assembly including a trim cover, a strap cooperating with the seat, the seat frame member, and/or the vehicle framework to secure the trim cover, and a holder member comprising a curved profile and configured to retract together with the strap into the second aperture in the first position, the holder member comprising a first edge and a distal edge opposite to the first edge, the first edge of the holder member secured to the trim cover, and the distal edge being engaged with an engagement region on the panel in the second position,
wherein the trim cover is configured to cover the first aperture, the second aperture, and the anchor when the anchor is not in use in the first position, and to provide access to the anchor through the first aperture in the second position by being held via the holder member in the second position.

15. The vehicle seat assembly of claim 14, wherein in the second position, the strap is tensioned with respect to the seat, the vehicle framework, and/or the seat frame member such that the holder member can be held via interference fit of the distal edge of the holder member within the engagement region.

16. The vehicle seat assembly of claim 14, wherein the engagement region is a slot defined between a material member and the panel such that the distal edge of the holder member can be retained therein via interference fit, when the material member is positioned adjacent to at least a portion of the second aperture.

17. The vehicle seat assembly of claim 14, wherein the strap includes a positioning tab to facilitate engagement of the distal edge of the holder member with the engagement region.

18. A method, comprising:
forming a panel for a vehicle seat with a first aperture and a second aperture therethrough such that an anchor for a child safety seat is accessible via the first aperture, the second aperture being spaced apart from the first aperture;
forming a trim cover assembly including a trim cover, a strap, and a holder member sized to retract into and emerge from the second aperture, the holder member comprising a first edge and a distal edge opposite to the first edge, the first edge of the holder member secured to the trim cover;
connecting the trim cover assembly to a framework of a vehicle, a seat framework, and/or the vehicle seat by the strap such that the trim cover is movable between a first position covering the first aperture to visibly hide the anchor and a second position via movement of the strap in and out of the second aperture;
positioning the trim cover assembly in the first position adjacent to the panel to cover the first aperture, the second aperture, and the anchor;
moving the trim cover assembly to the second position spaced apart from the first aperture to provide access to the anchor through the first aperture; and
holding the trim cover assembly in the second position by securing the distal edge of the holder member with an engagement region defined on the panel.

19. The method of claim 18, wherein the engagement region is a slot formed between the panel and a material member and is located adjacent to the second aperture and wherein the engagement member is formed as a pocket on the panel to receive the distal edge of the holder member via an interference fit.

20. The method of claim 18, wherein the holder member has a curved profile with at least one curved portion having a degree of curvature of up to 90 degrees.

* * * * *